US009486795B2

(12) United States Patent
Long et al.

(10) Patent No.: US 9,486,795 B2
(45) Date of Patent: Nov. 8, 2016

(54) CATALYTIC CRACKING CATALYST, ITS PREPARATION AND USE

(75) Inventors: Jun Long, Beijing (CN); Yujian Liu, Beijing (CN); Huiping Tian, Beijing (CN); Liuzhou Zhao, Beijing (CN); Yuxia Zhu, Beijing (CN); Zhenyu Chen, Beijing (CN); Yun Xu, Beijing (CN); Jing Fan, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 742 days.

(21) Appl. No.: 12/666,711

(22) PCT Filed: Jun. 27, 2008

(86) PCT No.: PCT/CN2008/001241
§ 371 (c)(1),
(2), (4) Date: Jul. 7, 2010

(87) PCT Pub. No.: WO2009/000164
PCT Pub. Date: Dec. 31, 2008

(65) Prior Publication Data
US 2010/0270210 A1    Oct. 28, 2010

(30) Foreign Application Priority Data

Jun. 27, 2007  (CN) .......................... 2007 1 0118011

(51) Int. Cl.
| C10G 11/05 | (2006.01) |
| B01J 35/10 | (2006.01) |
| B01J 29/06 | (2006.01) |
| B01J 29/40 | (2006.01) |
| B01J 29/80 | (2006.01) |
| B01J 29/08 | (2006.01) |
| B01J 29/70 | (2006.01) |

(52) U.S. Cl.
CPC ................ B01J 35/10 (2013.01); B01J 29/06 (2013.01); B01J 29/40 (2013.01); B01J 29/80 (2013.01); B01J 35/108 (2013.01); C10G 11/05 (2013.01); B01J 29/084 (2013.01); B01J 29/405 (2013.01); B01J 29/7007 (2013.01); B01J 29/7057 (2013.01); B01J 2229/42 (2013.01)

(58) Field of Classification Search
CPC B01J 35/108; B01J 35/1052; B01J 35/1057; B01J 35/1061; B01J 35/1066; B01J 35/1038; B01J 37/0018; C10G 11/05
USPC ...... 208/113, 120.01, 120.1; 502/67, 63, 64, 502/77
See application file for complete search history.

(56) References Cited

U.S. PATENT DOCUMENTS 3,541,179 A   11/1970  Okagami et al.
3,647,682 A    3/1972  Rabo et al.
3,696,053 A *  10/1972  Le Page ................ C01B 33/113
                                                  502/208
3,725,495 A    4/1973  Wrisberg et al.
3,839,485 A   10/1974  Wrisberg et al.
3,867,279 A *  2/1975  Young ........................... 208/114
4,003,825 A *  1/1977  Mitchell et al. ........... 208/120.1
4,198,319 A    4/1980  Alafandi et al.
4,326,993 A    4/1982  Chester et al.
4,535,071 A *  8/1985  Schneider ................ B01J 23/80
                                                  502/342
4,597,724 A    7/1986  Sato et al.
4,760,040 A    7/1988  Sato et al.
4,784,750 A   11/1988  Dufresne et al.
4,814,316 A *  3/1989  Pellet et al. ............. 208/120.01
5,160,601 A * 11/1992  Pecoraro .................. 208/120.15
5,380,690 A    1/1995  Zhicheng et al.
5,545,602 A *  8/1996  Nelson et al. ................ 502/314
5,951,963 A    9/1999  He et al.
6,342,153 B1   1/2002  Guan et al.
6,776,899 B2   8/2004  Lam et al.
7,514,385 B2   4/2009  Du et al.
2004/0110629 A1  6/2004  Stamires et al.
2005/0241995 A1 11/2005  Smith et al.
2005/0269246 A1* 12/2005  Wachter et al. ......... 208/120.01
2008/0093263 A1  4/2008  Cheng et al.

FOREIGN PATENT DOCUMENTS

| CN | 1043520 A | 7/1990 |
| CN | 1069016 A | 2/1993 |
| CN | 1093101 A | 10/1994 |

(Continued)

OTHER PUBLICATIONS

International Search Report for International Application No. PCT/CN2008/001241 mailed Oct. 9, 2008.
Reinforcement of novel active calcium carbonate for rubber, Special Purpose Rubber Products, col. 6, 1985, pp. 7-10, 50.
English language Abstract for CN 1043520 A.
English language Abstract for CN 1048428 C.
English language Abstract for CN 1055877 C.
English language Abstract for CN 1069016 A.
English language Abstract for CN 1069682 C.
English language Abstract for CN 1205306 C.
English language Abstract for CN 1222558 A.
English language Abstract for CN 1240814 A.

(Continued)

Primary Examiner — Michelle Stein
(74) Attorney, Agent, or Firm — Novick, Kim & Lee, PLLC; Allen Xue

(57) ABSTRACT

A catalyst for catalytically cracking hydrocarbon oils contains a substrate comprising alumina and a molecular sieve, characterized in that the pore distribution of said catalyst is 5-70% of the <2 nm pores, 5-70% of the 2-4 nm pores, 0-10% of the 4-6 nm pores, 20-80% of the 6-20 nm pores, and 0-40% of the 20-100 nm pores, based on the pore volume of pores having a size of no more than 100 nm. The catalyst of this invention has a large BET pore volume, a high capacity for cracking heavy oils, and a high capacity for resisting coking.

21 Claims, 1 Drawing Sheet

(56) References Cited

FOREIGN PATENT DOCUMENTS

| | | | |
|---|---|---|---|
| CN | 1 114 916 A | 1/1996 |
| CN | 1221015 A | 6/1999 |
| CN | 1222558 A | 7/1999 |
| CN | 1048428 C | 1/2000 |
| CN | 1240814 A | 1/2000 |
| CN | 1055877 C | 8/2000 |
| CN | 1296860 A | 5/2001 |
| CN | 1069682 C | 8/2001 |
| CN | 1311288 A | 9/2001 |
| CN | 1325940 A | 12/2001 |
| CN | 1354224 A | 6/2002 |
| CN | 1393399 A | 1/2003 |
| CN | 1465527 A | 1/2004 |
| CN | 1504540 A | 6/2004 |
| CN | 1508223 A | 6/2004 |
| CN | 1566267 A | 1/2005 |
| CN | 1205306 C | 6/2005 |
| CN | 1660967 A | 8/2005 |
| CN | 1727444 A | 2/2006 |
| CN | 1923364 A | 3/2007 |
| CN | 1964785 A | 5/2007 |
| DE | 152356 | 11/1981 |
| DE | 225135 | 7/1985 |
| EP | 0 925 831 A2 | 6/1999 |
| JP | 56091841 A | 7/1981 |
| JP | 59196745 A | 11/1984 |
| JP | 60-222428 | 11/1985 |
| JP | 61278590 A | 12/1986 |
| JP | 62033547 A | 2/1987 |
| JP | 7278567 A | 10/1995 |
| JP | 10297918 A | 11/1998 |
| JP | 2004528963 A | 9/2004 |
| JP | 2005536343 A | 12/2005 |
| JP | 2006503689 A | 2/2006 |
| JP | 2008501522 A | 1/2008 |
| JP | 2008518760 A | 6/2008 |
| SU | 1214726 | 2/1986 |
| WO | WO 2005/123252 A1 | 12/2005 |

OTHER PUBLICATIONS

English language Abstract for CN 1296860 A.
English language Abstract for CN 1311288 A.
English language Abstract for CN 1325940 A.
English language Abstract for CN 1354224A.
English language Abstract for CN 1393399 A.
English language Abstract for CN 1465527 A.
English language Abstract for CN 1504540 A.
English language Abstract for CN 1508223 A.
English language Abstract for CN 1566267 A.
English language Abstract for CN 1660967 A.
English language Abstract for CN 1727444 A.
English language Abstract for CN 1923364 A.
English language Abstract for DD 152,356.
English language Abstract for DD 225,135.
English language Abstract for SU 1,214,726.
English language Abstract for JP60-222428.
Extended European Search Report for European Patent Application No. 08772994.3, mailed Apr. 27, 2012.
Communication pursuant to Article 94(3) EPC for European Patent Application No. 08772994.3, mailed Nov. 7, 2014, (5 pages).

* cited by examiner

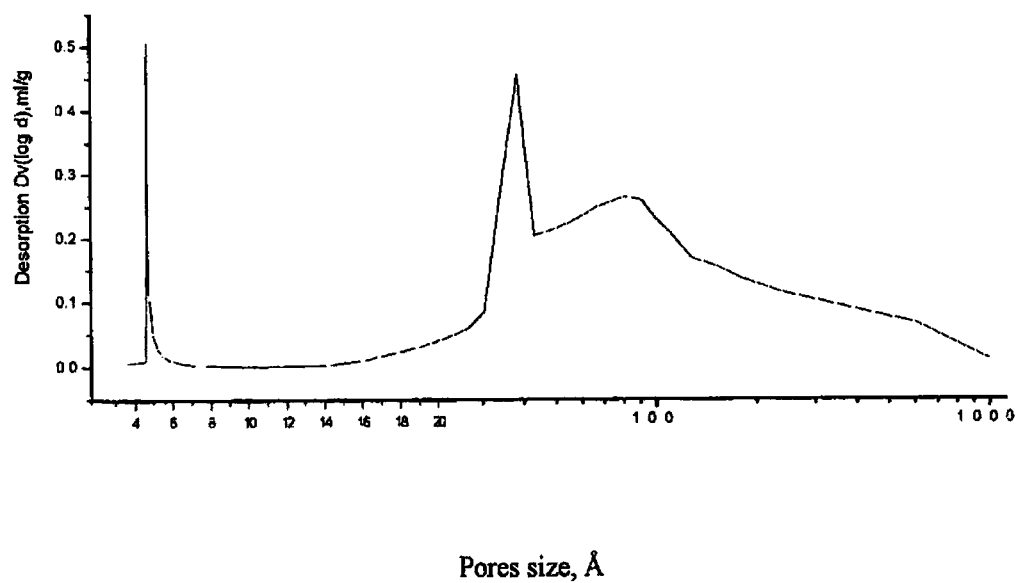

CATALYTIC CRACKING CATALYST, ITS PREPARATION AND USE

TECHNICAL FIELD

This invention relates to a catalyst for catalytically cracking hydrocarbon oils and its preparation method, especially to a catalytic cracking catalyst for producing light olefins and its preparation method.

BACKGROUND ARTS

The catalysts for preparing light olefins by catalytic cracking or pyrolysis with petroleum hydrocarbons as feed stocks comprise three types: the first type is supported metal catalysts with oxides as substrates such as the catalysts disclosed in U.S. Pat. No. 3,541,179, U.S. Pat. No. 3,647,682, DD225,135, and SU1214726, which use $SiO_2$, $Al_2O_3$ or other oxides as substrates to support metal elements of Groups IIB, VB, VIIB, and VIIIB. This kind of catalysts are merely suitable for the preparation of light olefins by the catalytic cracking of light feed stocks (boiling range <220° C.). The second type is composite oxide catalysts such as the catalysts disclosed in U.S. Pat. No. 3,725,495 and U.S. Pat. No. 3,839,485, which use $ZrO_2$ and/or $HfO_2$ as main components and contain active alumina, at least one component selected from $Cr_2O_3$, MnO, and $Fe_2O_3$, and at least one component selected from oxides of alkali metals or alkali earth metals, and the catalyst disclosed by DD152,356, which uses amorphous $SiO_2.Al_2O_3$ as the catalyst for cracking hydrocarbon oils to prepare light olefins. The third type of catalysts is the zeolites containing catalysts, especially MFI-structured zeolite (five-member ring high silica zeolite) containing ones. This type of catalysts can be used alone or as catalytic cracking additive.

JP60-222428 discloses a process for preparing $C_2^=-C_4^=$ by catalytically cracking $C_5$-$C_{25}$ parafins at 600-750° C. using a catalyst containing ZSM-5 zeolite and $Al_2O_3$.

CN1205306C discloses a catalyst for preparing light olefins by cracking petroleum hydrocarbons, which catalyst contains 0-70 wt. % of clay, 5-99 wt. % of inorganic oxides and 1-50 wt. % of zeolites based on the weight of the catalyst, wherein said zeolite is 25-100 wt % of MFI-structured zeolite and 0-75 wt. % of Y-zeolite, characterized in that said MFI-structured zeolite contains phosphor and a transition metal M and has an anhydrous chemical formula of $(0-0.3)Na_2O.(0.3-5) Al_2O_3.(1-10)P_2O_5.(0.7-15)M_xO_y.(0-10)RE_2O_3.(70-98)SiO_2$ based on the mass of the oxide, wherein M is one or two metals selected from Fe, Co, Ni, Cu, Zn, Mo, and Mn.

CN1069016A discloses a process for preparing ethylene by cracking heavy petroleum hydrocarbons at 650-900° C. using a catalyst containing 30-90 wt. % of $SiO_2$, 20-70 wt. % of $Al_2O_3$, 0.5-30% by weight of oxides of alkali metals or alkali earth metals, and 1-30 wt. % of faujasite.

CN1093101A discloses a cracking catalyst for producing light olefins, which catalyst consists of 0-70% of clay, 5-99% inorganic oxides, and 1-50% zeolites (based on the weight of the catalyst), wherein the zeolite is a mixture of 0-25 wt. % of REY or high silica Y-zeolite and 75-100 wt. % of five-member ring high silica zeolite containing phosphor and rare earths.

CN1048428C discloses a catalyst for converting petroleum hydrocarbons to light olefins, which catalyst consists of 0-70 wt. % of clay, 5-90 wt. % of inorganic oxides and 10-35 wt. % of zeolites, wherein the zeolite consists of 20-75 wt. % of five-member ring high silica zeolite containing phosphor and rare earths, 20-75 wt. % of high silica Y-zeolite, and 1-25 wt. % of Y-zeolite containing rare earths.

CN1222558A discloses a catalyst for preparing light olefins by catalytic pyrolysis, which catalyst has the following composition (based on the weight of the catalyst): 10-70 wt. % of clay, 5-85 wt. % of inorganic oxides and 1-50 wt. % of zeolites, wherein the zeolite is 0-25 wt. % of Y-zeolite and 75-100 wt. % of five-member ring high silica zeolite containing phosphor and aluminum or magnesium or calcium, and said high silica zeolite is ZSM-5, ZSM-8 or ZSM-11 type zeolite containing 2-8% phosphor and 0.3-3% aluminum or magnesium or calcium (in terms of oxide) with a silica/alumina ratio of 15-60.

CN1069682C discloses a pillared interlayered clay catalyst for preparing ethylene, propylene, and butene by the catalytic pyrolysis of heavy oils, which catalyst consists of 30-75 wt. % of aluminum cross-linked pillared interlayered clay, 10-40 wt. % of inorganic oxide binders containing aluminum or silicon or zirconium, 0-30 wt. % of high silica zeolite with the five-member ring structure, 0-10 wt. % of a modifying component selected from magnesium, aluminum, phosphor, tin, polyethylene glycol or their mixture, and 0-50 wt. % of clay of the kaolin family.

CN1660967A discloses a catalyst for increasing the yield of ethylene and propylene by catalytic pyrolysis, which catalyst contains 7-70 wt. % of clay, 3-70 wt. % of mesopore silica-alumina materials, 5-80 wt. % of inorganic oxides, and 5-60 wt. % of MFI-structured zeolite CN1354224A discloses a catalytic cracking catalyst for producing gasoline rich in isomeric alkanes, propylene, and isobutane, which catalyst consists of 0-70 wt. % of clay, 5-90 wt. % of inorganic oxides, and 1-50 wt. % of zeolites based on the weight of the catalyst, wherein said zeolite is a mixture of (1) 20-75% high silica Y-zeolite having a silica/alumina ratio of 5-15 and containing 8-20 wt. % of rare earths in terms of $RE_2O_3$ and (2) 20-75% high silica Y-zeolite having a silica/alumina ratio of 16-50 and containing 2-7 wt. % of rare earths in terms of $RE_2O_3$ and (3) 1-50% β-zeolite or mordenite or ZRP-zeolite based on the zeolite weight. By using this catalyst, the content of isomeric alkanes in gasoline can be increased together with the production of propylene and isobutane being increased.

CN1566267A discloses a catalytic pyrolysis process for preparing ethylene and propylene, which comprises introducing a preheated petroleum hydrocarbon feed stock into a lift pipe reactor, contacting the feed with a hot catalyst containing a five-member ring high silica zeolite, conducting reaction under catalytic pyrolysis conditions, separating the reaction products and spent catalyst. The reaction products are conveyed to the subsequent separation system for product separation, and the spent catalyst is returned to the reactor after being stripped and regenerated for recycle, wherein said five-member ring high silica zeolite contains phosphor and transition metals.

CN1043520A discloses a cracking catalyst, the substrate of which is 0-70 wt. % of clay and 5-99 wt. % of inorganic oxides, and the active component is a mixture of 1-50 wt. % of ZSM-5 and Y-type molecular sieve. In the active component, ZSM-5 accounts for 75-100% by weight and Y-type molecular sieve accounts for 0-25%.

CN1508223A discloses a hydrogenation catalyst wherein the substrate contains alumia, active component comprises molybdenum and/or W and Ni, the pore of a size of 2-6 nm accounts for 70-90% of the total pore volume.

The content of macropores in the prior art catalysts is low, so these catalysts show an insufficient capacity for cracking heavy oils when used in catalytically cracking heavy oils and provide low yields when used for preparing light olefins and propylene by catalytic cracking.

CONTENT OF THE INVENTION

One of the technical problems to be solved by the present invention is to provide a catalyst for catalytically cracking hydrocarbon oils; the second technical problem to be solved is to provide a process for preparing the above catalyst; and the third problem to be solved is to provide a method for applying the catalyst in catalytic cracking, which method can increase the yield of light olefins.

This invention provides a catalyst for catalytically cracking hydrocarbon oils, which catalyst contains a substrate comprising alumina and a molecular sieve, characterized in that the pore distribution of said catalyst is 5-70% of the <2 nm pores, 5-70% of the 2-4 nm pores, 0-10% of the 4-6 nm pores, 20-80% of the 6-20 nm pores, and 0-40% of the 20-100 nm pores, based on the pore volume of pores having a size of no more than 100 nm.

This invention provides a process for preparing a catalytic cracking catalyst, which process comprises the steps of mixing a substrate comprising alumina and/or its precursors with a molecular sieve, slurrying and spray-drying the mixture, characterized in that a pore-extender is introduced in the mixing step and said pore-extender is one or more selected from boric acid and salts of alkali metals. The weight ratio of the pore-extender to the substrate is 0.1:100-15:100 based on the weight of the substrate.

This invention provides a catalytic cracking process, which comprises a step of contacting a hydrocarbon oil with a catalyst, characterized in that said catalyst comprises the catalyst according to the present invention.

Because a pore-extender is introduced in the preparation of the catalyst of this invention, the pore volume of macropores increases and thus raises the capacity of the catalyst for cracking heavy oils, coke-tolerance and coke-resistance of the substrate, the utilization rate of the active components, and the retention ratio of the crystallinity of the molecular sieve after deactivation. When metal halides are introduced during preparation, the abrasion resistance of the catalyst can be raised. The catalytic cracking process provided by this invention has a high capacity for cracking heavy oils and when the prepared catalyst contains MFI-structured molecular sieve, the yield of propylene in catalytic cracking is high. For example, the catalyst prepared by this invention contains 20 wt. % of a molecular sieve and 80% by weigh of substrate, wherein the molecular sieve contains 10 wt. % of REHY-zeolite and 90 wt. % of ZRP-zeolite. The substrate contains 26 wt. % of pseudo-boehmite and alumina sol, 69 wt. % of kaolin, 5% of the weight of $TiO_2$. Potassium sulfate is used as a pore-extender in the preparation, and its amount is 7.4% of the weight of the substrate. The pore volume of the catalyst measured by BET method is 0.256 ml/g, and the abrasion index is 2% by weight, while the pore volume of the catalyst prepared according to a prior process for preparing the DCC catalyst containing the same amount of molecular sieve is 0.185 ml/g and the abrasion index is 2% by weight. When using 30 m. % of residual oil+70 m. % of VGO as a feed stock and conducting the catalytic cracking reaction under the conditions of a temperature of 680° C., a catalyst/oil weight ratio of 10, a water/oil mass ratio of 0.8:1, and a weight hourly space velocity of 10 the catalyst of this invention presents a propylene yield of 21.88% by weight, a coke yield of 1.09% by weight, and a heavy oil yield of 1.05% by weight, while the catalyst prepared by a prior art process presents a propylene yield of 19.26% by weight, a coke yield of 1.28% by weight, and a heavy oil yield of 1.55% by weight.

BRIEF DESCRIPTION OF THE DRAWINGS

FIG. 1 illustrate the pore distribution of the catalyst of Example 1.

SPECIFIC MODE FOR CARRYING OUT THE INVENTION

The singular forms "a", "an", and "the" include plural referents unless the context clearly dictates otherwise.

The catalyst for catalytically cracking hydrocarbon oils according to the present invention contains a substrate comprising alumina and a molecular sieve, characterized in that the pore distribution of said catalyst is 5-70%, preferably 5-60%, of the <2 nm pores, 5-70%, preferably 10-60%, more preferably 15-50%, of the 2-4 nm pores, 0-10% of the 4-6 nm pores, 20-80%, preferably 25-70%, more preferably 30-60%, of the 6-20 nm pores, and 0-40% of the 20-100 nm pores, based on the pore volume of pores having a size of no more than 100 nm.

The catalyst according to the present invention has a ratio of the volume of 6-20 nm pores to that of 2-4 nm pores being 0.5-4.

The volume of the 6-10 nm pores in the catalyst according to the present invention accounts for 10-50%, preferably 15-40%.

The catalyst according to the present invention preferably contains 60-95 wt. % of a substrate, 5-40 wt. % of a molecular sieve, and said molecular sieve contains 25-100 wt. % of MFI-structured zeolite, 0-75 wt. % of Y-zeolite, and 0-20 wt. % of β-zeolite. The content of alumina in the substrate coming from alumina and/or its precursors is 5-100% by weight, and the content of other substrate components does not exceed 95% by weight. The pore volume of said catalyst measured by the BET method is 0.19-0.4 ml/g.

In the catalyst according to the present invention, said substrate contains one or more types of alumina derived from alumina or its precursors, and the content of alumina is preferably 5-80% by weight. The alumina and its precursor are preferably one or more of alumina sol, phospho-alumina sol, various aluminum-containing salts (such as various aluminates, and sulfate, nitrate, and halides of aluminum), γ-alumina, η-alumina, θ-alumina, and χ-alumina, hydrated alumina with the structure of pseudo-boehmite, hydrated alumina with the structure of diaspore, hydrated alumina with the structure of gibbsite, and hydrated alumina with the structure of bayerite. More preferably, said alumina and its precursor are pseudo-boehmite or mixtures of pseudo-boehmite with one or more of alumina and other precursors of alumina.

The catalyst according to the present invention may also contain one or more of clay and oxides of Groups IIA and IVA non-aluminum elements. Said oxides of non-aluminum elements are derived from one or more of the oxides of said non-aluminum elements or their precursors. For example, silica and its precursors may be one or more selected from silica sol, water glass, silicates, silica-alumina sol, silica-alumina gel, and various organo-silicon compounds, preferably water glass and/or silica sol. The content of clay and said non-aluminum oxides does not exceed 95% by weight based on the weight of the substrate, and the content of clay preferably does not exceed 60% by weight. It is preferable that the weight ratio of the non-aluminum oxide to the alumina substrate in the substrate is 1: (0.3-1) calculated in oxide.

In the catalyst according to the present invention, said zeolite is one or more of MFI-structured zeolite, Y-zeolite, and O-zeolite. Said Y-zeolite is preferably one or more of Y-zeolite containing phosphor and/or rare earths, ultrastable Y-zeolite, ultrastable Y-zeolite containing phosphor and/or rare earths, HY-zeolite, and HY-zeolite containing phosphor and/or rare earths. More preferably, said zeolite is one or more of ultrastable Y-zeolite, REY, or REHY. Said MFI-structured zeolite is one or more selected from ZSM-5 zeolite, ZRP-zeolite, and their modifications such as the modified MFI-structured zeolite containing phosphor and transition metals disclosed in CN 1465527A, i.e., ZSM-5 zeolite modified with phosphor and one metal selected from Fe, Co, and Ni, having an anhydrous chemical formula of $(0-0.3)Na_2O.(0.5-5)Al_2O_3.(1.3-10)$ $P_2O_5.(0.7-15)$ $M_xO_y.(70-97)SiO_2$ calculated in the mass of the oxide, where x denotes the atom number of M; y denotes the atom number of O; and M is one of Fe, Co, and Ni.

In the catalyst according to the present invention, said substrate preferably also contains metal components coming from halides of Groups IIA, IB, IIB, and IVB metals, and the content of said metal component does not exceed 15% by weight based on the weight of the substrate, preferably being 0.1-12% by weight, and more preferably, being 0.1-6% by weight. Said metal component is more preferably one or more of Groups IVB and IIA metals, and most preferably, it is Ti and/or Mg. If the substrate contains said metal components, the abrasion resistance of the catalyst is raised.

The pore volume of the catalyst provided by the present invention measured by the nitrogen adsorption volumetric method is 0.19-0.4 ml/g, preferably 0.196-0.26 ml/g. For the nitrogen adsorption volumetric method, please refer to analytical method RIPP151-90 in "Yang Cuiding et al, Analytic Methods in Petroleum Chemical Industry" (RIPP Experimental Methods), Science press, 1990.

FIG. 1 illustrate the pore distribution of the catalyst of Example 1, which is measured by the nitrogen adsorption volumetric method. As can be seen from the FIGURE, there is a distinct adsorption peak at 6-20 nm, showing that said catalyst comprises pores of 6-20 nm.

In the catalyst preparation process according to the present invention, the weight ratio of said pore-extender to the substrate is preferably 0.1:100-10:100. Said salt of alkali metals is preferably one or more of soluble salts of alkali metals K, Na, or Li such as borates, phosphates, sulfates, nitrates, carbonates, or hydrochloride.

In the catalyst preparation process according to the present invention, said technique for mixing and slurrying the substrate and molecular sieve is well known to the skilled in the art. It is possible to slurry the substrate and molecular sieve separately, and then mix the two slurries, or mix and slurry a part of the substrate in the preparation of the substrate, and then introduce the molecular sieve and the remaining substrate and slurry, or introduce the substrate into the molecular sieve slurry and then slurry. Said pore-extender is introduced into the slurry before spray drying. It is preferable that the pore-extender is introduced into the substrate-containing slurry. After introducing the pore-extender, slurrying is performed to dispense the pore-extender into the slurry. The slurrying step is conducted for at least 5 min, preferably 10-90 min. The slurry containing pore-extender is aged in static state under the temperature of 50-80° C. for a time of 0.5-3 hr after the pore-extender is incorporated thereinto.

Phosphoric acid can be introduced in the step of mixing in the catalyst preparation process according to the present invention.

In the catalyst preparation process according to the present invention, one or more of halides of Groups IIA, IB, IIB, and IVB metals can be introduced into the slurrying step. Said metal halide is preferably introduced after introducing the pore-extender and before spray drying. The amount of the introduced metal halide does not exceed 15% by weight, preferably 0.1-12% by weight, and more preferably 0.1-6% by weight based on the weight of the substrate. Said metal halide is preferably one or more of the halides of Groups IVB and IIA metals, more preferably one or more of the halides of Ti and/or Mg such as $TiCl_4$, $MgF_2$, and $MgCl_2$. The introduction of the metal halide can improve the abrasion resistance of the prepared catalyst.

In the catalyst preparation process according to the present invention, the amount of the substrate and molecular sieve is preferably such that the finally obtained catalyst contains 60-95 wt. % of the substrate and 5-40 wt. % of the molecular sieve.

In the catalyst preparation process according to the present invention, said alumina is preferably one or more of γ-alumina, η-alumina, θ-alumina, and χ-alumina. Said precursor of alumina is preferably alumina sol, phospho-alumina sol, various aluminum-containing salts (such as various aluminates, and sulfate, nitrate, and halide of aluminum), hydrated alumina with the structure of pseudo-boehmite, hydrated alumina with the structure of diaspore, hydrated alumina with the structure of gibbsite, and hydrated alumina with the structure of bayerite. More preferably, said precursor of alumina is pseudo-boehmite or its mixtures with one or more selected from alumina sol, phospho-alumina sol, hydrated alumina with the structure of diaspore, hydrated alumina with the structure of gibbsite, and hydrated alumina with the structure of bayerite. It is preferable that said alumina and/or its precursor are pseudo-boehmite or mixtures of pseudo-boehmite with one or more of alumina or other alumina precursors. More preferably, said substrate contains pseudo-boehmite and alumina sol. The content of pseudo-boehmite in the substrate is preferably 5-95% by weight calculated in oxide, based on the weight of the substrate.

In the catalyst preparation process according to the present invention, said substrate may also contain the substrates commonly used in other catalytic cracking catalysts such as one or more of non-aluminum inorganic oxide substrates and clay. Said non-aluminum inorganic oxide substrate is preferably one or more of the oxides of Groups IIIA and IVA elements and their precursors and more preferably, it is one or more of oxides of silicon, boron, tin, lead, gallium, and indium and their oxide precursors. Preferably, the amounts of various components are such that, the content of alumina and/or its precursor is 5-100% by weight calculated in alumina; the content of the non-aluminum inorganic oxide does not exceed 95% by weight calculated in oxide; and the content of clay does not exceed 95% by weight, based on the weight of the substrate. More preferably, the content of alumina and/or its precursors is 5-80% by weight and the content of clay does not exceed 60% by weight.

In the catalyst preparation process according to the present invention, said oxide of silicon and their precursors are one or more of silica gel, silica sol, silica hydrosol, water glass, silicates, organo-silicon compounds, silica-alumina sol, and silica-alumina gel.

In the catalyst preparation process according to the present invention, said clay is one or more of clay customarily used for cracking catalysts such as one or more of kaolin, halloysite, montmorillonite, kieselguhr, endellite, soapstone, rectorite, sepiolite, attapulgite, hydrotalcite, and bentonite.

In the catalyst preparation process according to the present invention, said molecular sieve is one or more selected from the molecular sieve commonly used for catalytic cracking, preferably an MFI-structured zeolite or mixtures of the MFI-structured zeolite with one or more selected from Y-type molecular sieve, and β-zeolite.

In the catalyst preparation process according to the present invention, said spray drying is known in the art and there is no special requirement for it. For example, the temperature of the tail gas in spray drying is 100-300° C.

The catalyst preparation process according to the present invention may also comprise the steps of calcining, washing, and drying. Said methods of calcining, washing, and drying are known in the art and there is no special requirement for them. For example, the calcination temperature is 300-700° C.; the drying temperature is 100-300° C.; and the catalyst is washed with deionized water until the content of sodium oxide in the catalyst does not exceed 0.5% by weight.

In the catalytic cracking process according to the present invention, said conditions for contacting the catalyst with hydrocarbon oils are known in the art. For example, the contacting temperature is 400-750° C. According to the catalytic cracking process according to the present invention, when the catalyst used contains MFI-structured zeolite, the reaction temperature is preferably 480° C.-560° C., and steam is introduced during the reaction with the ratio of steam to the raw oil being 0.7-14:1.

According to the instant catalytic cracking process, besides the catalyst provided by the present invention, said catalyst may also contains other cracking catalysts. For example, when the catalyst according to the present invention contains MFI-structured zeolite, the catalyst according to the present invention may be used solely, or as a additive for producing light olefins after mixing with other cracking catalysts. When used as a additive, the content of the catalyst according to the present invention is 1-30% by weight, preferably 5-30% by weight based on the total weight of the catalyst.

Cracking catalysts with macropore substrates can be prepared by the catalyst preparation process of this invention. The catalyst according to the present invention can be used as a additive or catalyst in the catalytic cracking of hydrocarbon oils, and it is especially suitable for the catalytic cracking of heavy oils. Said hydrocarbon oils include, for example, atmospheric gas oil, vacuum gas oil, atmospheric residual oil, and vacuum residual oil. The process according to the present invention can be used for producing light olefins, especially propylene.

The present invention is further illustrated with the flowing examples, but is not intended to be limited thereby In the examples and comparative examples, ZRP-zeolite, REHY-zeolite, and β-zeolite are all the products of Catalyst Plant, Qilu Petrochemicals Co., wherein ZRP-zeolite has a $SiO_2/Al_2O_3$ mole ratio of 30 and contains 2.0 wt. % of $RE_2O_3$ and 4.0 wt. % of $P_2O_5$. For the determination of abrasion index and pore volume, reference is made to RIPP29-90 and RIPP151-90 in "Yang Cuiding et al, Analytic Methods in Petroleum Chemical Industry" (RIPP Experimental Method), Science press, 1990".

Example 1

20 kg decationized water was mixed with 11.9 kg pseudo-boehmite (industrial product of Shandong Aluminum Plant with a solid content of 63% by weight). The mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and slurried for 5 min, and then added with 1.75 kg potassium borate (analytically pure), the mixture being slurried for 15 min. The above two slurries were mixed and stirred uniformly, and then the mixed slurry was standing at 65° C. for 1.5 h for aging, with the pH value being maintained at 2-4 (adjusted with hydrochloric acid). Then the temperature was decreased to 55° C. and added with 13.5 kg alumina sol (product of Catalyst Plant, Qilu Petrochemicals Co. with an $Al_2O_3$ content of 21.7% by weight). The mixture was stirred for 40 min and 32.1 kg molecular sieve slurry (containing 2.0 kg REHY-zeolite and 9.0 kg ZRP-zeolite) was added. 2 kg $TiCl_4$ was added and the mixture was stirred uniformly. The resultant slurry was spray dried and washed to remove free Na ions, yielding catalyst A after being dried. The pore distribution is shown in Table 1.

Example 2

20 kg decationized water was mixed with 11.9 kg pseudo-boehmite (industrial product of Shandong Aluminum Plant with a solid content of 63% by weight). The mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and slurried for 5 min, and then added with 3 kg potassium sulfate (industrially pure, 98 wt %), the mixture being slurried for 15 min. The above two slurries were mixed and stirred uniformly, and then the mixed slurry was standing at 65° C. for 1.5 h for aging, with the pH value being maintained at 2-4 (adjusted with hydrochloric acid). Then the temperature was decreased to 55° C. and added with 13.5 kg alumina sol (product of Catalyst Plant, Qilu Petrochemicals Co. with an $Al_2O_3$ content of 21.7% by weight). The mixture was stirred for 40 min and 32.1 kg molecular sieve slurry (containing 1.0 kg REHY-zeolite, 8.5 kg by weight of ZRP-zeolite, and 0.5 kg β-zeolite) was added. 5 kg $TiCl_4$ was added and the mixture was stirred uniformly. The resultant slurry was spray dried and washed to remove free Na ions, yielding catalyst B after being dried. The pore distribution is shown in Table 1.

Example 3

20 kg decationized water was mixed with 11.9 kg pseudo-boehmite (industrial product of Shandong Aluminum Plant with a solid content of 63% by weight). The mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and slurried for 5 min, and then added with 15.0 kg water glass (product of Catalyst Plant, Qilu Petrochemicals Co. with an $SiO_2$ content of 19.9% by weight). The mixture was slurried for 15 min and adjusted to a pH value of 3 with hydrochloric acid, added with 3 kg potassium sulfate, and slurried for 15 min. The above two slurries were mixed and stirred uniformly, and then the mixture was standing at 65° C. for 1.5 h for aging, with the pH value being maintained at 2-4. Then the temperature was decreased to 55° C. and 13.5 kg alumina sol was added (product of Catalyst Plant, Qilu Petrochemicals Co. with an $Al_2O_3$ content of 21.7% by weight). The mixture was stirred for 40 min and 32.1 kg molecular sieve slurry (containing 1.0 kg REHY-zeolite, 8.5 kg by weight of ZRP-zeolite, and 0.5 kg β-zeolite) was added. 5 kg TiCl$_4$ was added and the mixture was stirred uniformly. The slurry was spray dried and molded, and washed to remove free Na ions, yielding catalyst C after being dried. The pore distribution is shown in Table 1.

Example 4

20 kg decationized water was mixed with 11.9 kg pseudo-boehmite (industrial product of Shandong Aluminum Plant with a solid content of 63% by weight). The mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and slurried for 5 min, and then added with 1.75 kg boric acid (analytically pure), the mixture being slurried for 15 min. The above two slurries were mixed and stirred uniformly, and then the mixed slurry was standing at 65° C. for 1.5 h for aging, with the pH value being maintained at 2-4 (adjusted with hydrochloric acid). Then the temperature was decreased to 60° C. and added with 13.5 kg alumina sol (product of Catalyst Plant, Qilu Petrochemicals Co. with an Al$_2$O$_3$ content of 21.7% by weight). The mixture was stirred for 40 min and 32.1 kg molecular sieve slurry (containing 2.0 kg REHY-zeolite and 9.0 kg ZRP-zeolite) was added. The resultant slurry was spray dried and washed to remove free Na ions, yielding catalyst D after being dried. The pore distribution is shown in Table 1.

Example 5

20 kg decationized water was mixed with 9.9 kg pseudo-boehmite (industrial product of Shandong Aluminum Plant with a solid content of 63% by weight). The mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and slurried for 5 min, and then added with 4.01 kg potassium borate (analytically pure). The mixture was slurried for 15 min. The above two slurries were mixed and stirred uniformly, and then the mixture was standing at 65° C. for 1.5 h for aging, with the pH value being maintained at 2-4. Then the temperature was decreased to 55° C. and 13.5 kg alumina sol was added (product of Catalyst Plant, Qilu Petrochemicals Co. with an Al$_2$O$_3$ content of 21.7% by weight). The mixture was stirred for 40 min and 18.7 kg molecular sieve slurry (containing 1.0 kg REHY-zeolite, 5.2 kg by weight of ZRP-zeolite) was added. 4 kg TiCl$_4$ was added and the mixture was stirred uniformly. The slurry was spray dried and molded, and washed to remove free Na ions, yielding catalyst E after being dried. The pore distribution is shown in Table 1.

Example 6

20 kg decationized water was mixed with 14.9 kg pseudo-boehmite (industrial product of Shandong Aluminum Plant with a solid content of 63% by weight) and the mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and the mixture was slurried for 5 min. Then 1.6 kg potassium sulfate (industrially pure, 98%) was added, and the mixture was slurried for 15 min. The above two slurries were mixed and stirred uniformly, and then the mixture was standing at 65° C. for 1.5 h for aging, with the pH value being maintained at 2-4. Then the temperature was decreased to 55° C. and 13.5 kg alumina sol (product of Catalyst Plant, Qilu Petrochemicals Co. with an Al$_2$O$_3$ content of 21.7% by weight) was added. The mixture was stirred for 40 min and 45.1 kg molecular sieve slurry (containing 1.5 kg REHY-zeolite, 11.3 kg of ZRP-zeolite, and 1 kg β-zeolite) was added. 3 kg TiCl$_4$ was added and the mixture was stirred uniformly. The slurry was spray dried and molded and washed to remove free Na ions, yielding catalyst F after being dried. The pore distribution is shown in Table 1.

Example 7

20 kg decationized water was mixed with 14.9 kg pseudo-boehmite (industrial product of Shandong Aluminum Plant with a solid content of 63% by weight) and the mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and the mixture was slurried for 5 min. Then 2.6 kg potassium sulfate (industrially pure, 98%) was added, and the mixture was slurried for 15 min. The above two slurries were mixed and stirred uniformly, and then the mixture was standing at 65° C. for 1.5 h for aging, with the pH value being maintained at 2-4. Then the temperature was decreased to 55° C. and 15.5 kg alumina sol (product of Catalyst Plant, Qilu Petrochemicals Co. with an Al$_2$O$_3$ content of 21.7% by weight) was added. The mixture was stirred for 40 min and 22.1 kg molecular sieve slurry (containing 0.5 kg REHY-zeolite, 6.3 kg of ZRP-zeolite, and 1.5 kg (3-zeolite) was added. 3 kg TiCl$_4$ was added and the mixture was stirred uniformly. The slurry was spray dried and molded and washed to removed free Na ions, yielding catalyst G after being dried. The pore distribution is shown in Table 1.

Comparative Example 1

A catalyst was prepared according to the process for preparing the DCC industrial catalyst (the process in CN1048428C).

92.6 kg decationized water was mixed with 38.7 kg halloysite (industrial product of Suzhou Porcelain Clay Co. with a solid content of 72.3% by weight) and the mixture was slurried. Then 15.9 kg pseudo-boehmite was added and the pH value of the mixture was adjusted to 3 with hydrochloric acid, the mixture being stirred uniformly. Then the mixture was standing at 65° C. for aging for 1 h, and its pH value was maintained at 2-4. The temperature was decreased to 55° C. and 13.5 kg alumina sol was added. The mixture was stirred for 40 min and 32.1 kg molecular sieve slurry (containing 1.0 kg by weight of REHY-zeolite and 9.0 kg by weight of ZRP-zeolite) was added. The mixture was slurried, spray dried, and molded, and washed to remove free Na ions, yielding comparative catalyst DB-1 after being dried. The pore distribution is shown in Table 1.

Comparative Example 2

20 kg decationized water was mixed with 11.9 kg pseudo-boehmite (industrial product of Shandong Aluminum Plant with a solid content of 63% by weight) and the mixture was slurried and adjusted to a pH value of 3 with hydrochloric acid. 72.6 kg decationized water was mixed with 38.7 kg halloysite (industrial product of Suzhou Porcelain Clay Co. with a solid content of 72.3% by weight) and the mixture was slurried for 5 min. The above two slurries were mixed and stirred uniformly, and standing at 65° C. for 1.5 h for aging, with the pH value being maintained at 2-4. The temperature was then decreased to 55° C. and 13.5 kg alumina sol (product of Catalyst Plant, Qilu Petrochemicals Co. with a $Al_2O_3$ content of 21.7% by weight) was added. The mixture was stirred for 40 min and 32.1 kg molecular sieve slurry (containing 1.0 kg by weight of REHY-zeolite, 8.5 kg by weight of ZRP-zeolite, and 0.5 kg β-zeolite) was added. 5 kg $TiCl_4$ was added, and the mixture was slurried uniformly. The resultant slurry was spray dried and molded, and washed to remove free Na ions, yielding catalyst sample DB-2 after being dried.

The abrasion indices, pore volumes and crystallinity of Catalysts A-G and DB-1, DB-2 are shown in Table 2.

Examples 8-9

Catalyst samples A-B were evaluated on a small fixed fluidized bed apparatus with 30 m. % of residual oil+70 m. % of wax oil (its properties are shown in Table 3) as a feed stock under a reaction temperature of 680° C., a catalyst/oil weight ratio of 10, a water/oil mass ratio of 0.8:1, and a weight hourly space velocity of 10 $h^{-1}$. The catalyst was pre-treated with 100% steam at 800° C. for 17 h and the load of the catalyst was 180 g. The evaluation results are shown in Table 4.

Comparative Example 3

Catalyst DB-1 was evaluated according to the method in Example 8. The evaluation results are shown in Table 4.

TABLE 3

| | | |
|---|---|---|
| Density (20° C.), g/cm³ | | 0.9006 |
| Kinematic viscosity (100° C.), mm²/s | | 11.0 |
| Conradson Carbon residue, wt % | | 3.14 |
| Element composition, wt % | C | 85.7 |
| | H | 12.8 |
| | N | 0.38 |
| | S | 0.77 |
| Family composition (hydrocarbon species), wt % | Saturated HCs | 57.5 |
| | Aromatics | 24.5 |
| | Gum | 16.9 |
| | Asphaltene | 1.1 |
| Metal content, ppm | Ni | 5.0 |
| | V | 0.8 |
| Boiling range, ° C. | IBP | — |
| | 5% | 217 |
| | 40% | 396 |
| | 70% | 456 |
| Characterization factor | | 12.0 |

TABLE 4

| | Example No. | | |
|---|---|---|---|
| | Comparative Example 3 | 8 | 9 |
| | Catalyst No. | | |
| | DB-1 | A | B |
| Dry gas, wt % | 3.86 | 4.41 | 4.07 |
| Hydrogen, wt % | 0.06 | 0.08 | 0.05 |
| Methane, wt % | 0.42 | 0.46 | 0.40 |
| Ethane, wt % | 0.31 | 0.33 | 0.28 |
| Ethylene, wt % | 3.06 | 3.54 | 3.59 |
| LPG, wt % | 43.67 | 45.24 | 48.34 |

TABLE 1

| | Example No. | | | | | | | | |
|---|---|---|---|---|---|---|---|---|---|
| | 1 | 2 | 3 | 4 | 5 | 6 | 7 | Comparative Example 1 | Comparative Example 2 |
| Catalyst No. | A | B | C | D | E | F | G | DB-1 | DB-2 |
| <2 nm | 21 | 20 | 23 | 21 | 13 | 35 | 15 | 22 | 18 |
| 2-4 nm | 17 | 20 | 16 | 25 | 10 | 35 | 37 | 70 | 74 |
| 4-6 nm | 5 | 3 | 3 | 2 | 1 | 7 | 1 | 3 | 2 |
| 6-20 nm | 47 | 42 | 52 | 45 | 75 | 20 | 20 | 4.5 | 5 |
| 6-10 nm | 25 | 22 | 27 | 20 | 15 | 15 | 16 | 3 | 3 |
| 20-100 nm | 10 | 15 | 6 | 7 | 1 | 3 | 27 | 0.5 | 1 |
| 6-20 nm/2-4 nm | 2.76 | 2.10 | 3.25 | 1.80 | 7.50 | 0.57 | 0.54 | 0.064 | 0.068 |

TABLE 2

| | Example No. | | | | | | | | |
|---|---|---|---|---|---|---|---|---|---|
| | Comparative Example 1 | Comparative Example 2 | 1 | 2 | 3 | 4 | 5 | 6 | 7 |
| Catalyst No. | DB-1 | DB-2 | A | B | C | D | E | F | G |
| AI, % | 2.0 | 1.0 | 1.5 | 2.0 | 1.9 | 2.9 | 1.0 | 1.9 | 2.7 |
| $V_{BET}$, ml/g | 0.185 | 0.190 | 0.238 | 0.256 | 0.247 | 0.240 | 0.236 | 0.241 | 0.257 |
| ACR, % (Crystal structure of fresh catalyst) | 15.6 | 15.4 | 16.6 | 16.3 | 16.4 | 16.1 | 16.6 | 16.2 | 15.3 |
| ACR, % (800° C./17 h deactivated) | 11.4 | 11.2 | 13.8 | 13.3 | 13.5 | 13.4 | 13.2 | 13.5 | 11.9 |

TABLE 4-continued

| | Example No. | | |
|---|---|---|---|
| | Comparative Example 3 | 8 | 9 |
| | Catalyst No. | | |
| | DB-1 | A | B |
| Propane, wt % | 2.04 | 2.22 | 2.10 |
| Propylene, wt % | 19.26 | 21.08 | 21.88 |
| n-Butane, wt % | 1.19 | 1.15 | 1.23 |
| Iso-butane, wt % | 5.55 | 5.34 | 5.45 |
| Butene-1, wt % | 2.74 | 2.76 | 3.07 |
| Iso-butene, wt % | 6.45 | 6.5 | 7.40 |
| cis-butene-2, wt % | 2.71 | 2.57 | 3.06 |
| trans-butene-2, wt % | 3.74 | 3.62 | 4.15 |
| Gasoline, wt % | 43.34 | 40.55 | 40.36 |
| Diesel oil, wt % | 6.29 | 7.1 | 5.21 |
| Heavy oil, wt % | 1.55 | 1.41 | 1.05 |
| Coke, wt % | 1.28 | 1.27 | 1.09 |
| Conversion wt % | 92.14 | 91.47 | 93.74 |

The invention claimed is:

1. A catalyst for catalytically cracking hydrocarbon oils, comprising a molecular sieve and a substrate comprising alumina,
wherein said catalyst has a pore volume of 0.196-0.26 ml/g, and a pore distribution of 13-35% of the <2 nm pores, 10-37% of the 2-4 nm pores, about 1-7% of the 4-6 nm pores, 20-75% of the 6-20 nm pores and 1-27% of the 20-100 nm pores, based on a pore volume of the pores having a size of no more than 100 nm,
wherein the pore volume and the pore size distribution is determined using a nitrogen adsorption volumetric method,
wherein the molecular sieve comprises 76-85 wt. % of MFI-structured zeolite, 6-18 wt. % of Y-zeolite, and 0-18 wt. % of β-zeolite, and
wherein said catalyst is prepared using a pore extender selected from the group consisting of boric acid, and borates, sulfates, nitrates, carbonates, hydrochlorides of Na, K, or lithium.

2. The catalyst for catalytically cracking hydrocarbon oils according to claim 1, wherein a ratio of a volume of 6-20 nm pores to a volume of 2-4 nm pores is 0.5-4.

3. The catalyst for catalytically cracking hydrocarbon oils according to claim 1, wherein the volume of the 6-10 nm pores accounts for 10-50% of the pore volume of the pores having a size of no more than 100 nm.

4. The catalyst for catalytically cracking hydrocarbon oils according to claim 1, wherein the volume of the 6-10 nm pores accounts for 15-40% of the pore volume of the pores having a size of no more than 100 nm.

5. The catalyst for catalytically cracking hydrocarbon oils according to claim 1, wherein the volume of the 6-20 nm pores in said catalyst accounts for 25-70% of the pore volume of the pores having a size of no more than 100 nm.

6. The catalyst for catalytically cracking hydrocarbon oils according to claim 5, wherein the volume of the 6-20 nm pores in said catalyst accounts for 30-60% of the pore volume of the pores having a size of no more than 100 nm.

7. The catalyst for catalytically cracking hydrocarbon oils according to claim 1, wherein said alumina is derived from alumina and/or its precursors, said precursor of alumina is one or more of pseudo-boehmite, alumina sol, phospho-alumina sol, aluminum-containing acid salts, hydrated alumina with the structure of diaspore, hydrated alumina with the structure of gibbsite, and hydrated alumina with the structure of bayerite, and said alumina is one or more of γ-alumina, η-alumina, θ-alumina, and χ-alumina.

8. The catalyst for catalytically cracking hydrocarbon oils according to claim 7, wherein said precursor of alumina is pseudo-boehmite or a mixture of pseudo-boehmite with one or more selected from alumina sol, phospho-alumina sol, aluminum-containing acid salts, hydrated alumina with the structure of diaspore, hydrated alumina with the structure of gibbsite, and hydrated alumina with the structure of bayerite.

9. The catalyst for catalytically cracking hydrocarbon oils according to claim 1, 7 or 8, wherein said substrate further comprises one or more of oxides of non-aluminum elements of Groups IIIA and IVA and precursors thereof, and clay.

10. The catalyst for catalytically cracking hydrocarbon oils according to claim 9, wherein said substrate comprises one or more of clay, silica sol, water glass, and silica-alumina gel.

11. The catalyst according to claim 1, wherein said catalyst contains 60-95 wt. % of the substrate and 5-40 wt. % of the molecular sieve.

12. The catalyst according to claim 1, wherein said catalyst has a pore volume of 0.23-0.26 ml/g.

13. A process for preparing a catalytic cracking catalyst, comprising:
forming a slurry comprising a molecular sieve, a substrate comprising alumina and/or a precursor thereof, a pore extender, and a metal halide; and
spray-drying the slurry,
wherein a weight ratio of the pore-extender to the substrate is 0.1:100-15:100 based on a weight of the substrate, and an amount of the metal halide is less than or equal to 15% by weight based on the weight of substrate,
wherein the pore extender is selected from the group consisting of boric acid, and borates, sulfates, nitrates, carbonates, hydrochlorides of Na, K, and lithium,
wherein said catalyst has a pore volume of 0.196-0.26 ml/g, and a pore distribution of 13-35% of the <2 nm pores, 10-37% of the 2-4 nm pores, 1-7% of the 4-6 nm pores, 20-75% of the 6-20 nm pores and 1-27% of the 20-100 nm pores, based on a pore volume of the pores having a size of no more than 100 nm, and
wherein the pore volume and the pore distribution is determined using a nitrogen adsorption volumetric method wherein the molecular sieve comprises 76-85 wt. % of MFI-structured zeolite, 6-18 wt. % of Y-zeolite, and 0-18 wt. % β-zeolite.

14. The process according to claim 13, wherein the pore extender is selected from the group consisting of boric acid, and borates, sulfates of Na, K, and lithium.

15. The process according to claim 14, wherein the pore extender is selected from the group consisting of boric acid and borates of Na, K, and lithium.

16. The process according to claim 13, wherein said metal halide is one or more of halides of Groups IVB and IIA metals.

17. The process according to claim 13, characterized in that said metal halide is the halide of Ti and/or Mg.

18. The process according to claim 13, wherein the slurry further comprising phosphoric acid.

19. A catalytic cracking process, which comprises a step of contacting a hydrocarbon oil with a catalyst according to claim 1.

20. The process according to claim 14, wherein the pore extender is a sulfate of Na, K, or lithium.

21. The process according to claim 13, wherein said catalyst has a pore volume of volume of 0.23-0.26 ml/g.

* * * * *